United States Patent [19]
Thomas

[11] Patent Number: 5,328,226
[45] Date of Patent: Jul. 12, 1994

[54] SUPPORT STRAP FOR FRONT SEATS OF CARS

[76] Inventor: Donald E. Thomas, 6606 Matilija Ave., Van Nuys, Calif. 91405

[21] Appl. No.: 986,558

[22] Filed: Dec. 7, 1992

[51] Int. Cl.$^5$ .............................................. B60R 21/10
[52] U.S. Cl. .................................... 296/68.1; 280/748
[58] Field of Search ............... 296/68.1, 188, 35.2; 280/748

[56] References Cited

U.S. PATENT DOCUMENTS

| | | | |
|---|---|---|---|
| 2,896,999 | 7/1959 | Liubauskas | 296/68.1 |
| 3,222,084 | 12/1965 | Hesen | 280/748 |
| 3,988,028 | 10/1976 | Satzinger | 280/748 |
| 4,512,604 | 4/1985 | Maeda et al. | 296/68.1 |
| 4,639,040 | 1/1987 | Fujita et al. | 296/68.1 |

FOREIGN PATENT DOCUMENTS

| | | | |
|---|---|---|---|
| 2054917 | 5/1972 | Fed. Rep. of Germany | 280/748 |
| 143746 | 6/1987 | Japan | 280/748 |

Primary Examiner—Joseph D. Pape
Attorney, Agent, or Firm—Allan M. Shapiro

[57] ABSTRACT

A strap is secured across the passenger compartment of an automobile at a position behind the front seat backs and close to the top of the front seat backs. The strap is secured around the doorposts of a 4-door car to prevent the seat backs from collapsing backward due to impact on the car from the rear.

20 Claims, 2 Drawing Sheets

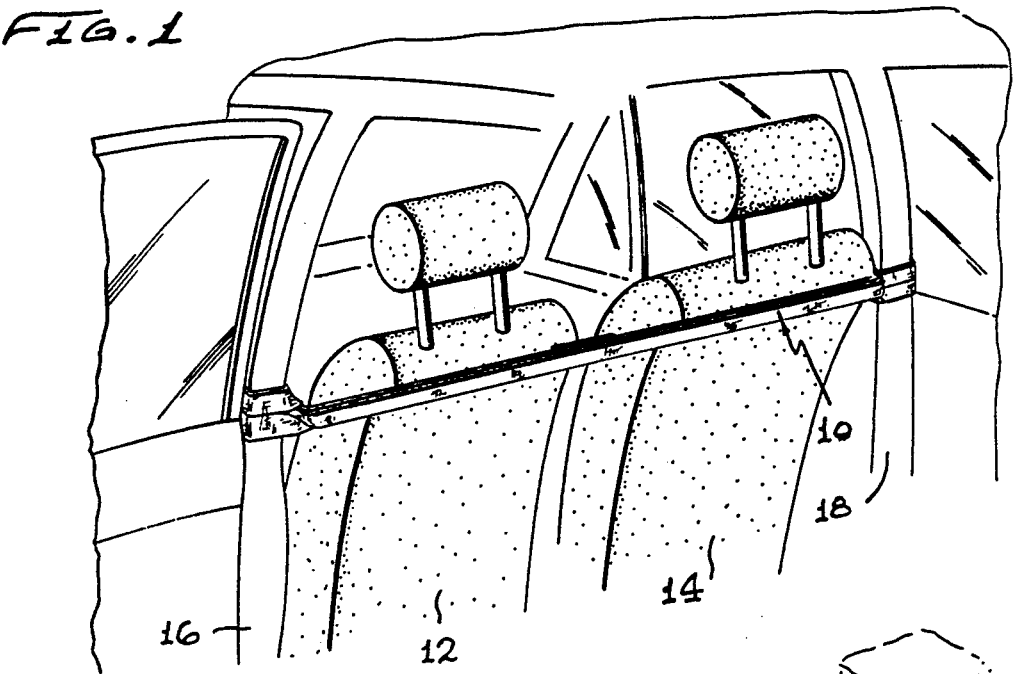
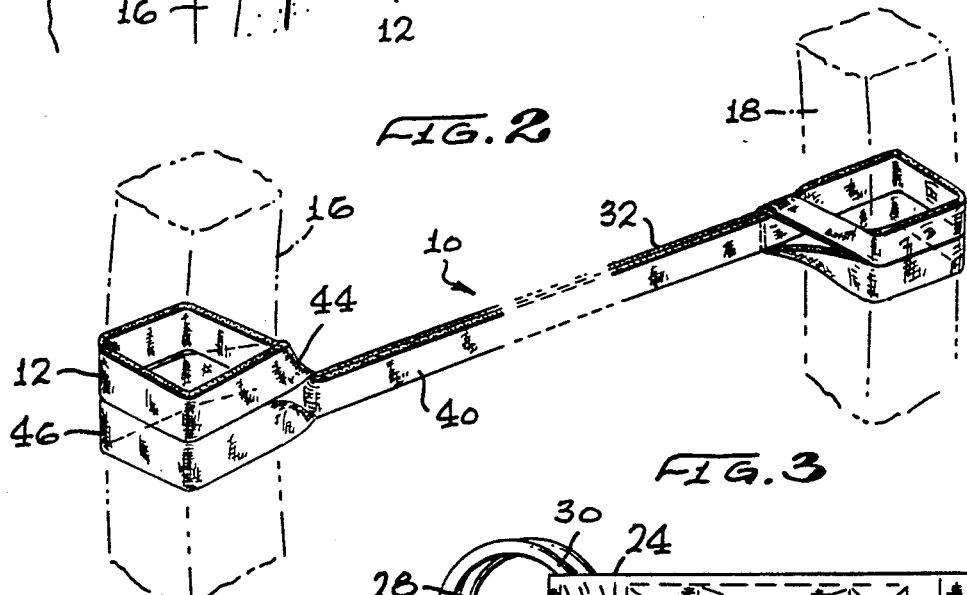
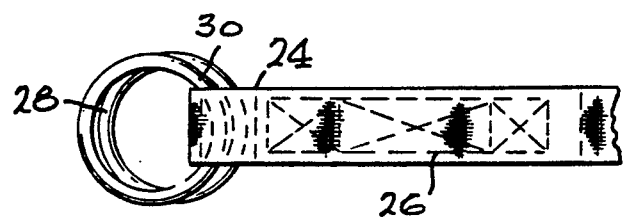
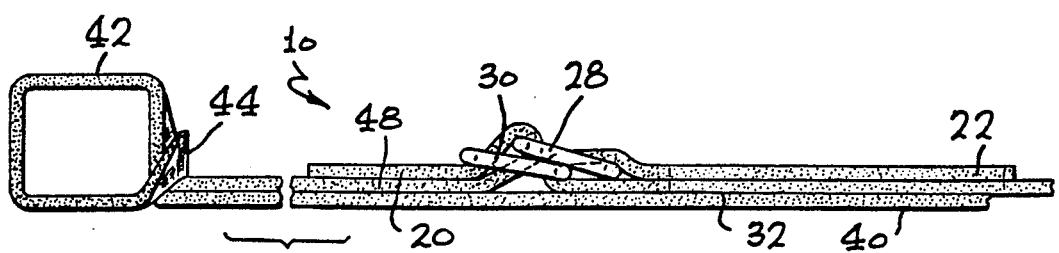

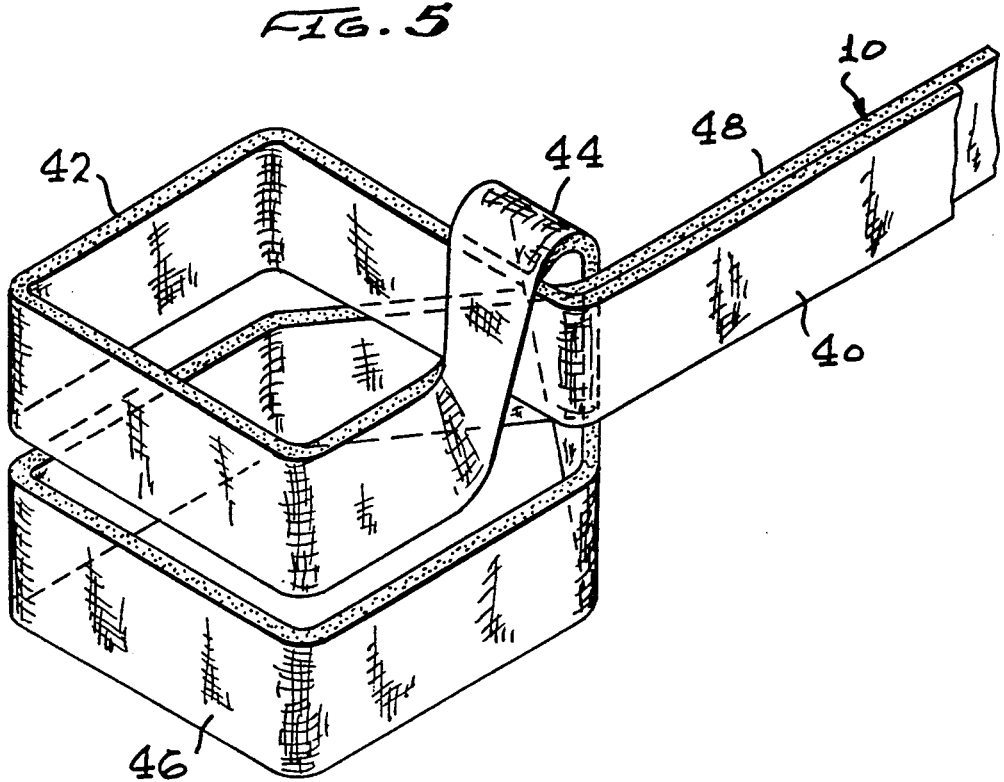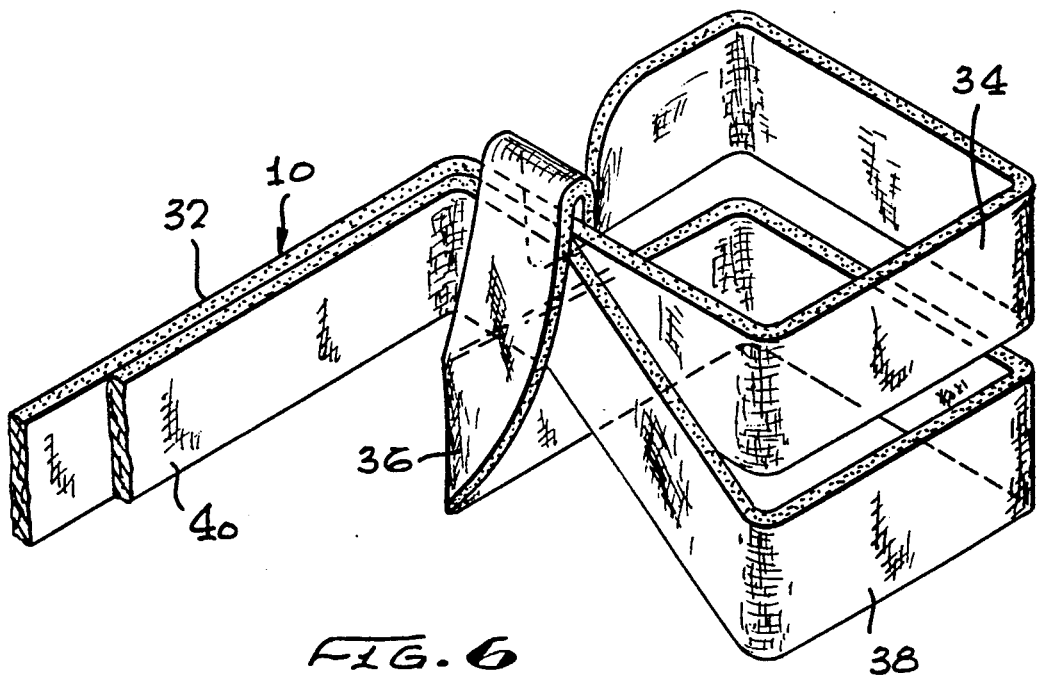

SUPPORT STRAP FOR FRONT SEATS OF CARS

FIELD OF THE INVENTION

This invention is directed to the support for the front seat of automobiles to minimize rearward failure of the seat backs due to impact on the car from the rear.

BACKGROUND OF THE INVENTION

The safety of those persons riding in an automobile has been enhanced by the use of seat belts and air bags. These safety devices help restrain the person from moving forward in the vehicle when the vehicle is impacted at the front. However, in rear-end collisions, when the automobile is impacted from the rear, it is the seat back which keeps the driver and front seat passenger from flying into the back of the car. The National Highway Transportation Safety Administration reports data that, in the calendar year 1990, more than 1,100 people were killed when the car in which they were riding was hit from behind. In addition, about 1,600 persons sustained life-threatening injuries like brain damage, loss of limb, burns or paralysis when the car in which they were riding was impacted from the rear. In such accidents, upon impact, the front seat back breaks and falls to a position where its top lies on the rear seat bottom cushion. The seat belt provides little restraint in this position, and the person slides back and collides into the back of the back seat. As the person in the front seat slides back under the seat belt, his head is forced into the rear seat back cushion with possible head injury and possible damage to the spine. In addition to these bodily risks, when the driver is thrown to this horizontal position, he can no longer reach the vehicle controls. This loss of control may lead to a second and otherwise avoidable accident. It is desirable to provide the conventional seat back with a supplemental restraint system to avoid or minimize the problems resulting from seat back failure.

SUMMARY OF THE INVENTION

In order to aid in the understanding of this invention, it can be stated in essentially summary form that it is directed to a strap for attachment across the passenger compartment of an automobile directly behind the backs of the front seats and adjacent below the tops of the seat backs so that, upon rear impact of the automobile, backward collapse of the front seat backs is prevented or at least inhibited. In a 4-door car, the strap is secured to the doorpost in a novel manner.

It is, thus, an object and advantage of this invention to provide a support strap to supplement the strength of the front seat backs of an automobile against rearward collapse by attaching the support strap across the automobile passenger compartment directly behind and adjacent below the top of the front seats of the automobile.

It is another object and advantage of this invention to provide a support strap which is inexpensive and easy to install so that the seat backs of automobiles can be strengthened against failure by rearward collapse.

It is another object and advantage of this invention to provide a support strap which attaches around the door posts of a 4-door automobile and which passes behind the front seat backs, in engagement therewith and close to the top thereof, so that the strap can be readily installed by the car owner to improve his safety.

The features of the present invention which are believed to be novel are set forth with particularity in the appended claims. The present invention, both as to its organization and manner of operation, together with further objects and advantages thereof, may be best understood by reference to the following description, taken in conjunction with the accompanying drawings.

BRIEF DESCRIPTION OF THE DRAWINGS

FIG. 1 is a perspective view of the passenger compartment of an automobile, looking forward and from one side, behind the front seats thereof, with parts broken away.

FIG. 2 is a perspective view of the support strap, with parts broken away and with the automobile door post shown in dashed lines.

FIG. 3 is an elevational view of a portion of the support strap showing the strap buckle, with the rest of the strap broken away.

FIG. 4 is a plan view of a portion of the support strap as installed, with parts broken away.

FIG. 5 is an enlarged perspective view of the left end of the support strap in the configuration shown in FIG. 2 in which it embraces the left door post, with parts broken away.

FIG. 6 is a perspective view of the right end of the support strap in the configuration shown in FIGURE 2 in which it embraces the right door post, with parts broken away.

DESCRIPTION OF THE PREFERRED EMBODIMENT

The support strap of this invention is generally indicated at 10 in FIGS. 1, 2 and 4. Only portions of the support strap 10 are shown in FIGS. 2 and 4. In FIGS. 1 and 2, the support strap 10 is shown in association with an automobile which is partially illustrated therein. The automobile has a frame which includes a floor, sides and top which define a passenger compartment. Front seat backs 12 and 14 are illustrated in FIG. 1, with parts broken away. The seat bottoms are secured to the floor of the car and are broken away in this figure. Door posts 16 and 18 are upright structural elements of the automobile and are secured to both the floor and the roof. The posts are usually present in 4-door automobiles and are body posts between the front and rear doors. The posts 16 and 18 are thus sturdy structural members in the automobile. Furthermore, these posts are usually about in line with the seat backs. The support strap 10 is engaged around the posts 16 and 18 and behind the seat backs 12 and 14, as illustrated in FIG. 1.

Support strap 10 is a strong, flexible fabric strap, which, when positioned as shown in FIG. 1, provides substantial support for the seat backs against substantial rearward displacement of the seat backs. A commercially available strap which is 1 wide and 3/32 inch thick has an 8000 pound tensile strength. It is believed that a strap of such strength is adequate to provide additional strength to the seat backs. The support strap 10 is a single strap having first and second ends 20 and 22 (see FIG. 4). The strap end 22 is turned back to form loop 24 and is sewn at seam lines 26 (see FIG. 3) to permanently retain the loop. Buckle rings 28 and 30 are retained in the loop 24. The buckle rings 28 and 30 have an inside opening at least as wide as the width of the strap. The buckle rings may be rectangular instead of the round configuration illustrated and should be seamless. The support strap is engaged around the posts and is tightened on itself in such a manner as to avoid stress concentrations in order to enhance working strength. The buckling of the strap to itself is not shown in FIGS. 1 and 2 so that the engagements around the door posts are seen better. These engagements also are shown in enlarged detail in FIGS. 5 and 6.

The terminology used herein to describe the strap and its portions and configurations is commonly used in connection with ropes and knots. Thus, for example, a "stand" is a generally straight central portion of the strap between attachment points or regions, and "bight" is a loop-over, i.e., a loop is made in the strap by folding the strap over itself to form a "bight".

In its installed position, stand 32 extends to the right inside the car behind the seat backs and at a level high up on the seat backs just below the top forward curve thereof. The stand 32 extends toward the front of the right seat post 18, but extends around the back to form loop 34, see FIG. 6. The top edge of the stand 32 defines a horizontal plane, and the loop 34 is twisted up out of that plane so that, where the loop 34 engages the three corners of the seat post, the loop 34 is above that plane. The loop 34 passes around the three corners of the seat post and then is formed into a bight 36 which engages around and encloses the stand 32 where it is adjacent the front inside seat post corner. From the bight 36, the strap passes back around the door post in the opposite direction in loop 38. Loop 38 is positioned below loop 34 on the door post so that the two loops are in edge-to-edge relationship, rather than overlapped relationship, around the three corners of the door post away from bight 36. From the loop 38, the strap passes through bight 36 and forms stand 40.

As seen in FIGS. 2 and 4, the stand 40 extends across the automobile toward its left door post 16. As seen in FIG. 5, the stand 40 passes toward the rear surface of the door post, but extends in a loop 42 around the two front and two outside corners of the door post. In this loop, the lower edge is above the plane defined by the top edge of stand 32. The top edge of stand 40 lies coincident to the top edge of stand 32. The loop 42 is raised so that its bottom edge lies at and above the top edge of loop 46. From the loop 42, the strap forms bight 44 through which the stand 40 passes on its way to loop 42. From the bight 44, the strap forms loop 46 which passes around the three other corners of the door post and then through bight 44 to form stand 48. The stand 48 extends to the strap end 20. The stand 48 passes through both of the buckle rings and then returns toward post 16 by extending around buckle ring 28 and back through buckle ring 30, as seen in FIG. 4. This provides a strap tightening buckle which provides for continuous tightening without incremental tightening points. The free strap end 20 is pulled to the left, as seen in FIG. 4, and this pulls the stands 32 and 48 toward each other to tighten the whole strap. As it is tightened, the stands and loops are worked to tension equally the various portions of the support strap.

It is important to note that the loops around the door post lie next to each other rather than overlap to provide a minimum of strap thickness at those locations. This is because minimum thickness is desirable to permit easy closing of the doors adjacent the door post and to minimize wear on the strap due to the opening and closing of the doors. As is seen in both FIGS. 5 and 6, the upper one of the loops around the door posts extends to the upper end of the bight so as to minimize twisting. Furthermore, the bight is formed by a quarter turn of the strap as it passes from the door post loop to the bight. Except for this quarter twist of the strap at the top and bottom of each bight, there is no twisting of the strap. Furthermore, these quarter turn twists at the top and bottom of each bight are in opposite directions so that the same side of the strap faces forward in stands 32 and 40 and in stands 40 and 48. This engagement around the door posts minimizes stress concentration and is neat in appearance.

With the support strap 10 in place and tightened as shown, should the automobile be impacted from the rear, the support strap 10 will provide some restraining force to hold the seat backs in their proper upright position. Depending upon seat structure, weights and accelerations, the seat backs are more likely to be retained in the proper position. This retaining of the seat backs will protect the occupants against seat back collapse and potential injury due to impact in the rear of the automobile. Thus, the support strap 10 can save equipment, injury and lives.

This invention has been described in its presently contemplated best mode, and it is clear that it is susceptible to numerous modifications, modes and embodiments within the ability of those skilled in the art and without the exercise of the inventive faculty. Accordingly, the scope of this invention is defined by the scope of the following claims.

What is claimed is:

1. A support strap for the front seats of four-door automobiles having left and right door posts adjacent such front seats, said support strap comprising:
   a central strap portion to be positioned across the automobile adjacent to and behind the back of such front seats at an elevation below and adjacent to the top of the seat backs, and
   left and right attachment means on said support strap, said left attachment means being for attachment to the left door post at a position adjacent to and an elevation below the top of the front seat backs, said right attachment means being for attachment to the right door post at a position adjacent to and an elevation below the top of the front seat backs so that the top of said seat is restrained against rearward motion caused by impact on the automobile from the rear.

2. The support strap of claim 1 wherein said left and right attachment means comprise left and right strap portions integral with said central strap portion and extending respectively from the left and right of said central strap portion, said left and right strap portions being for looping securement around said left and right doorposts respectively.

3. The support strap of claim 2 wherein a bight is formable in said left strap portion for looping securement around the left door post.

4. The support strap of claim 3 wherein said support strap is doubled to have forward and rear stands lying adjacent each other.

5. The support strap of claim 4 wherein said attachment means on the right door post comprises forward and rear stands and a looped bight, said forward and rear stands of said support strap passable through said bight at the right door post.

6. The support strap of claim 5 wherein one of said stands passable through said bight at the left door post is the same as one of said stands passable through said bight at the right door post.

7. The support strap of claim 6 wherein the other stands passable through said bights are attached to each other.

8. The support strap of claim 7 wherein said attachment of said other straps comprise locking attachment to tighten said support strap between said door posts.

9. The support strap of claim 8 wherein said locking attachment comprises a buckle attached to one of said stands and the other of said stands passable through said buckle.

10. A support strap for the front seats of four-door automobiles having left and right door posts adjacent such front seats, said support strap comprising:
   an elongated, flexible strap having a width and a thickness, said strap being doubled upon itself and locatable in back of the front seats at a position adjacent to and an elevation below the top of the seats so that the top of the seats is restrained against rearward movement, said strap being extendable around the left door post and right door post for attaching said strap to the automobile;
   a bight formable in said strap adjacent said left door post, said strap passable around said left door post and through said bight to tighten said bight on said left door post, said doubled strap then lying edge-to-edge around said left door post.

11. The support strap for front seats of automobiles in accordance with claim 10 wherein said strap is formable into a bight adjacent said right door post, said strap passable around said right door post and through said bight adjacent said right door post so that said strap can be tightened between said left and right door posts, said doubled strap then lying in edge-to-edge relationship around said right door post.

12. The support strap for front seats of automobiles in accordance with claim 11 wherein said strap through said bight adjacent said left door post is extendable across said automobile in first and second stands and said strap passing through said bight adjacent said right door post is extendable through said bight in first and third stands, said first stands then being contiguous and said second and third stands having tightening means therebetween for tightening said second and third stands with respect to each other.

13. The support strap for front seats of automobiles in accordance with claim 12 wherein said means for tightening said second and third stands with respect to each other comprise a buckle.

14. The support strap for front seats of automobiles of claim 10 wherein said doubled support strap passable through said bight adjacent said left door post comprise first and second stands and said support strap passable through said bight adjacent said right door post comprises first and third stands, said first stands being contiguous and said second and third stands having tightening means therebetween, said first and second stands then lying against each other where they extend out of said bight toward said right door post, said straps then lying in edge-to-edge relationship where they pass around said left door post.

15. The support strap for front seats of automobiles in accordance with claim 14 wherein said strap is formable into a bight adjacent said left door post by a quarter turn of said strap.

16. The support strap for front seats of automobiles in accordance with claim 15 wherein said bight adjacent said right door post is formable by a quarter turn of said strap adjacent said right door post.

17. The support strap for front seats of automobiles in accordance with claim 16 wherein said bight adjacent said right door post is so that the outside of said strap is the same side of the strap as it extends doubled around said right door post.

18. The support strap for front seats of automobiles in accordance with claim 14 wherein said attachment means between said second and third stands of said strap permit non-incremental tightening of said second and third stands with respect to each other.

19. The support strap for front seats of automobiles in accordance with claim 18 wherein said tightening means comprises a loop in said third stand and a buckle secured in said loop so that said second stand can be tightened through said buckle.

20. The support strap for front seats of automobiles in accordance with claim 19 wherein said buckle comprises first and second rings secured in said loop for tightening said second stand with respect to said third stand.

* * * * *